(12) United States Patent
Tanimoto

(10) Patent No.: US 7,400,714 B2
(45) Date of Patent: *Jul. 15, 2008

(54) COMMUNICATION DEVICE AND MANAGEMENT SERVER

(75) Inventor: Yoshifumi Tanimoto, Hirakata (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1084 days.

This patent is subject to a terminal disclaimer.

(21) Appl. No.: 10/314,886

(22) Filed: Dec. 9, 2002

(65) Prior Publication Data

US 2004/0109437 A1 Jun. 10, 2004

(51) Int. Cl.
H04M 11/10 (2006.01)

(52) U.S. Cl. .......................... 379/100.12; 379/100.14; 379/93.34; 354/440; 354/468; 354/514

(58) Field of Classification Search ............ 379/100.12, 379/100.14, 93.34; 354/440, 468; 364/514; 370/431, 395.5, 455, 461–465
See application file for complete search history.

(56) References Cited

U.S. PATENT DOCUMENTS

| | | | | |
|---|---|---|---|---|
| 4,942,540 | A * | 7/1990 | Black et al. | 709/228 |
| 5,452,420 | A * | 9/1995 | Engdahl et al. | 710/105 |
| 5,481,601 | A * | 1/1996 | Nazif et al. | 379/201.03 |
| 5,855,014 | A * | 12/1998 | Smith | 707/3 |
| 5,862,202 | A * | 1/1999 | Bashoura et al. | 379/100.14 |
| 6,385,179 | B1 * | 5/2002 | Malcolm et al. | 370/329 |
| 6,389,005 | B1 * | 5/2002 | Cruickshank | 370/352 |
| 7,062,642 | B1 * | 6/2006 | Langrind et al. | 713/1 |

FOREIGN PATENT DOCUMENTS

| | | |
|---|---|---|
| JP | 05-260234 | 10/1993 |
| JP | 05-347665 | 12/1993 |
| JP | 09-069890 | 3/1997 |
| JP | 10-334007 | 12/1998 |
| JP | 11-205573 | 7/1999 |
| JP | 11-289442 | 10/1999 |
| JP | 2000-196771 | 7/2000 |
| JP | 2000-209323 | 7/2000 |
| JP | 2000-232553 | 8/2000 |
| JP | 2001-014234 | 1/2001 |
| JP | 2001-067279 | 3/2001 |
| JP | 2001-320502 | 11/2001 |

OTHER PUBLICATIONS

Tsukushi Kitahara, "A lot can be done! P2P Application of Here Comes P2P Network" SoftwareDesign, Japan, Technology Reviewing Co., Ltd. JAug. 18, 2001, No. 31, pp. 124-127.

* cited by examiner

Primary Examiner—Quynh H Nguyen
(74) Attorney, Agent, or Firm—Hogan & Hartson LLP

(57) ABSTRACT

A communication device includes a communication unit carrying out a communication by a plurality of communication channels and a plurality of communication protocols and a management table including plural groups of registered information, wherein one group includes a communication channel and a communication protocol that can be used by a receiving communication device, and identification information used by the communication channel and the communication protocol. The communication device also includes a control unit obtaining the management table in advance, remote from the communication device, selecting one group of the registered information corresponding to the receiving communication device, and controlling the communication unit to carry out the communication using the selected group of registered information.

25 Claims, 9 Drawing Sheets

FIG. 2

| TERMINAL NAME | SPECIFYING NUMBER | COMMUNI-CATION CHANNEL | IDENTIFICATION INFORMATION | COMMUNICATION PROTOCOL | RELAY FUNCTION | RECEIVING ABILITY ||||
|---|---|---|---|---|---|---|---|---|---|
| | | | | | | RESOLUTION | MAXIMUM PAPER SIZE | ENCODING METHOD | COLOR |
| COMMUNI-CATION DEVICE 1 | 1111 | PSTN | 075-003-4567 | T.30 | AVAILABLE | 200dpi | A3 | MMR | NOT AVAILABLE |
| | | PBX | 2001 | T.30 | AVAILABLE | 200dpi | A3 | MMR | NOT AVAILABLE |
| | | LAN | ifax1@kasou.net | T.37S | AVAILABLE | 200dpi | A3 | JBIG | NOT AVAILABLE |
| COMMUNI-CATION DEVICE 2 | 2222 | PBX | 2002 | T.30 | AVAILABLE | 200dpi | A3 | JBIG,MMR | NOT AVAILABLE |
| | | PSTN | 075-003-4568 | T.30 | AVAILABLE | 200dpi | A3 | JBIG,MMR | NOT AVAILABLE |
| COMMUNI-CATION DEVICE 3 | 3333 | PSTN | 075-003-4569 | T.30 | AVAILABLE | 400dpi | A3 | MMR | NOT AVAILABLE |
| | | LAN | ifax2@kasou.net | T.37S,T.37F | AVAILABLE | 400dpi | A3 | ZIP | NOT AVAILABLE |
| COMMUNI-CATION DEVICE 4 | 4444 | LAN | 192.168.1.4 | T.38 | NOT AVAILABLE | 400dpi | A3 | GIF | NOT AVAILABLE |
| | | LAN | ifax3@kasou.net | T.37S,T.37F | NOT AVAILABLE | 400dpi | A3 | JBIG | NOT AVAILABLE |
| COMMUNI-CATION DEVICE 5 | 5555 | PSTN | 06-0003-4567 | T.30,BFT | AVAILABLE | 600dpi | B4 | JBIG,MMR | AVAILABLE |
| | | PBX | 2003 | T.30 | AVAILABLE | 600dpi | B4 | JBIG,MMR | AVAILABLE |
| | | LAN | 192.168.1.5 | T.38 | AVAILABLE | 600dpi | B4 | JPEG | AVAILABLE |
| | | LAN | ifax4@kasou.net | T.37S,T.37F | AVAILABLE | 600dpi | B4 | JPEG | AVAILABLE |
| COMMUNI-CATION DEVICE 6 | 6666 | PSTN | 06-0003-4568 | T.30,BFT | NOT AVAILABLE | 600dpi | B4 | JBIG,MMR | AVAILABLE |
| | | LAN | ifax5@kasou.net | T.37S,T.37F | NOT AVAILABLE | 600dpi | B4 | JPEG | AVAILABLE |

FIG. 6

| TERMINAL NAME | SPECIFYING NUMBER | COMMUNI-CATION CHANNEL | IDENTIFICATION INFORMATION | COMMUNICATION PROTOCOL | RELAY FUNCTION | RECEIVING ABILITY ||||
|---|---|---|---|---|---|---|---|---|---|
| | | | | | | RESOLUTION | MAXIMUM PAPER SIZE | ENCODING METHOD | COLOR |
| COMMUNI-CATION DEVICE 301 | 1111 | PSTN | 075-0003-4567 | T.30 | AVAILABLE | 200dpi | A3 | MMR | NOT AVAILABLE |
| | | PBX | 2001 | T.30 | AVAILABLE | 200dpi | A3 | MMR | NOT AVAILABLE |
| | | LAN | ifax1@kasou.net | T.37S | AVAILABLE | 200dpi | A3 | JBIG | NOT AVAILABLE |
| COMMUNI-CATION DEVICE 302 | 2222 | PBX | 2002 | T.30 | AVAILABLE | 200dpi | A3 | JBIG,MMR | NOT AVAILABLE |
| | | PSTN | 075-0003-4568 | T.30 | AVAILABLE | 200dpi | A3 | JBIG, MMR | NOT AVAILABLE |
| COMMUNI-CATION DEVICE 303 | 3333 | PSTN | 075-0003-4569 | T.30 | AVAILABLE | 400dpi | A3 | MMR | NOT AVAILABLE |
| | | LAN | ifax2@kasou.net | T.37S,T.37F | AVAILABLE | 400dpi | A3 | ZP | NOT AVAILABLE |
| COMMUNI-CATION DEVICE 304 | 4444 | LAN | 192.168.1.4 | T.38 | NOT AVAILABLE | 400dpi | A3 | GIF | NOT AVAILABLE |
| | | LAN | ifax3@kasou.net | T.37S,T.37F | NOT AVAILABLE | 400dpi | A3 | JBIG | NOT AVAILABLE |
| COMMUNI-CATION DEVICE 305 | 5555 | PSTN | 06-0003-4567 | T.30,BFT | AVAILABLE | 600dpi | B4 | JBIG,MMR | AVAILABLE |
| | | PBX | 2003 | T.30 | AVAILABLE | 600dpi | B4 | JBIG,MMR | AVAILABLE |
| | | LAN | 192.168.1.5 | T.38 | AVAILABLE | 600dpi | B4 | JPEG | AVAILABLE |
| | | LAN | ifax4@kasou.net | T.37S,T.37F | AVAILABLE | 600dpi | B4 | JPEG | AVAILABLE |
| COMMUNI-CATION DEVICE 306 | 6666 | PSTN | 06-0003-4568 | T.30,BFT | NOT AVAILABLE | 600dpi | B4 | JBIG,MMR | AVAILABLE |
| | | LAN | ifax5@kasou.net | T.37S,T.37F | NOT AVAILABLE | 600dpi | B4 | JPEG | AVAILABLE |

FIG. 9

| TERMINAL NAME | SPECIFYING NUMBER | COMMUNI-CATION CHANNEL | IDENTIFICATION INFORMATION | COMMUNI-CATION PROTOCOL | RELAY FUNCTION | RECEIVING ABILITY ||||
|---|---|---|---|---|---|---|---|---|---|
| | | | | | | RESOLUTION | MAXIMUM PAPER SIZE | ENCODING METHOD | COLOR |
| COMMUNI-CATION DEVICE 307 | 7777 | LAN | 192.168.1.7 | T.38 | AVAILABLE | 600dpi | A3 | JPEG | AVAILABLE |
| | | | ifax56@kassou.net | T.37S,T.37F | AVAILABLE | 600dpi | A3 | JBIG | AVAILABLE |

COMMUNICATION DEVICE AND MANAGEMENT SERVER

FIELD OF THE INVENTION

The present invention relates to a communication device using a plurality of communication channels or a plurality of communication protocols, and a management server that manages the communication channels and the communication protocols that is used in each communication device.

DESCRIPTION OF THE RELATED ART

Recently, communication devices are provided with multi-functions, and communication channels and communication protocols are diversified. As a result, communication devices that can use a plurality of communication channels or a plurality of communication protocols are being developed For example, a conventional facsimile machine could carry out only facsimile communication using PSTN (Public Switched Telephone Network). However, recently facsimile machines can use PBX Private Branch Exchange), and further include LAN (Local Area Network) interfaces. Therefore, the facsimile machine can carry out communications with terminals connected to a LAN, or communications using an intranet connected to the LAN or the Internet. In addition, the communications can be carried out by using various communication protocols, other than protocols used during tho facsimile communication. Such communication protocols include SMTP (Simple Mail Transfer Protocol). POP (Post Office Protocol), HTTP (Hyper Text Transfer Protocol), VoIP (Voice over IP), or the like, used with the LAN, the Internet, or the like.

Accompanying such diversification of the communication channels and the communication protocols, when specifying a receiving communication device, it is necessary to use identification information corresponding to each communication channel or communication protocol. For example, when using the PSTN, the identification information of the receiving communication device is a telephone number. When using the LAN or the Internet, the identification information is IP (Internet Protocol) address. When transmitting by electronic mail, the identification information is an electronic mail address. When using HTTP as the communication protocol, the identification information is the URL (Uniform Resource Locator).

In the conventional communication device that can use a plurality of communication channels or communication protocols, it is necessary to set the communication channel and the communication protocol to be used. In addition, it is necessary to set the identification information of the receiving communication device according to the set communication channel or the communication protocol. Therefore, it is necessary to know which communication channel and communication protocol that can be used by the receiving communication device, and then to make the setting of the communication channel and the communication protocol according to the receiving communication device. In addition, in the case the receiving communication device can also use a plurality of communication channels or communication protocols, it is necessary to set different identification information even for the same destination. Such a setting is extremely complicated. In addition, the user is responsible for selecting which communication channel or communication protocol to be used, The user was also required to select the communication channel or the communication protocol each time when carrying out a communication. Such an operation is troublesome for the user.

Furthermore, when a change is made in the communication channel or the communication protocol used in the receiving communication device, or when the communication device is updated or a new communication device is set up, if such a change is not notified to other communication devices, the communication device cannot be used. In addition, the receiving communication device is also required to notify the change to the user of other communication devices. Therefore, both the communication device and the receiving communication device had to be modified using complicated operations.

SUMMARY OF THE INVENTION

The present invention was made in consideration to the above-mentioned problems. It is thus an advantage of the present invention to provide a communication device that can carry out a communication with a desired communication device without a user carrying out complicated operations, without the user being conscious about a difference in a communication channel or a communication protocol or a difference in identification information corresponding to such communication channel and communication protocol, and without the user being conscious about a change that occurred in the communication channel, the communication protocol, or the identification information of a receiving communication device. In addition, another advantage of the present invention is to provide a management server for management such a communication device.

The communication device of the present invention includes a communication unit that can carry out a communication using a plurality of communication channels and a plurality of communication protocols. In addition, the communication device includes a management table formed from plural groups of registered information, wherein one group includes the communication channel and the communication protocol used by the receiving communication device, and the identification information used in the communication channel and the communication protocol. The communication device also includes a controller that obtains the management table from remote location in advance, selects information from the registered information, which corresponds to the receiving communication device, and carries out the communication by the communication unit.

In addition, the communication device of the present invention includes a communication unit that can carry out a communication by a plurality of communication channels and a plurality of communication protocols. The communication device also includes a controller that obtains one or plural groups of registered information from remote location, selects one registered information, and carries out the communication by the communication unit. Further, one group of registered information includes the communication channel and the communication protocol that can be used by the receiving communication device, and the identification information used in the communication channel and the communication protocol.

Accordingly, the communication device of the present invention obtains the registered information from remote location in advance as the management table. When carrying out the communication, the communication device selects one registered information corresponding to the receiving communication device in accordance with, for example, a prescribed priority order. Then, the communication device carries out the communication with the receiving communication device. Alternatively, when carrying out a communication, the communication device obtains one or a plurality of registered information from the remote location corresponding to the receiving communication device. Then, the communication device selects one registered information from the obtained registered information in accordance with, for example, a prescribed priority order. Subsequently, the communication device carries out the communication with the receiving communication device. At this time, the user can just designate the receiving communication device. The user is not required to set the communication channel or the communication protocol, or set the identification information corresponding to the communication channel and the communication protocol. In addition, the user is not required to be conscious about selecting the communication channel or the communication protocol. The communication channel, the communication protocol, the identification information or the like are selected automatically, and the communication is carried out. In addition, since the registered information selected is obtained from a remote location, the user is not required to register the information. Furthermore, if the registered information is managed under the newest state at the remote location, the communication channel or the communication protocol using the newest registered information can be selected automatically at all times. Further, the communication device is preferable to obtain the newest management table from a remote location. For example, the communication device can update the management table periodically, or by obtaining the new management table from a remote location when there has been a change in the registered information.

Furthermore, the management server of the present invention manages a plurality of communication devices that can carry out a communication using a plurality of communication channels and a plurality of communication protocols. The management server includes a communication unit that can carry out a communication directly or indirectly with the communication devise. In addition, the management server includes a management table formed from plural groups of registered information, wherein one group includes the communication channel and the communication protocol that can be used by the communication device, and the identification information to be used in the communication channel and the communication protocol. The management server also includes a controller for transmitting an or a part of the management table by the communication unit according to a request from the communication device, or under a prescribed timing, to the communication device that made the request or to each communication device.

Accordingly, the management server of the present invention can manage the registered information such as the communication channel, the communication protocol, and the identification information, that can be used in each communication device as the management table in a unified way. The management server can forward all or a part of the management table to the communication device, and the communication device can use the forwarded management table. Changes, additions, and deletions of the registered information in each communication device can be made to only the management server, and it is not necessary to notify the user of each communication device. In addition, by receiving the registered information from the management server, the user of either communication device is not required to carry out setting and registration in each communication device. Moreover, the communication can be carried out by using the newest registered information at all times.

The communication device of the present invention includes a communication unit that can carry out a communication using a plurality of communication channels and a plurality of communication protocols. In addition, the communication device includes a management table formed from plural groups of registered information, wherein one group includes the communication channel and the communication protocol that can be used by another communication device, and the identification information to be used in the communication channel and the communication protocol. The communication device also includes a controller for controlling the communication using one of the registered information. The controller includes a function for notifying the registered information from the communication unit to another communication device.

When notifying the registered information, at least the registered information of the communication device can be notified, for example, when there is a change in the communication channel or the communication protocol that can be communicated by the communication unit, or in accordance with an instruction from the user.

In addition, the communication device of the present invention includes a communication unit that can communicate by a plurality of communication channels and a plurality of communication protocols. The communication device also includes a management table formed from plural groups of registered information, wherein one group includes the communication channel and the communication protocol that can be used by another communication device, and the identification information to be used in the communication channel and the communication protocol. In addition, the communication device includes a controller for controlling the communication using one of the registered information. The controller includes a function for updating the management table by the registered information received from another communication device when receiving such registered information.

Further, the controller can include a function for requesting forwarding of the registered information in the management table to another communication device, and the management table can be updated by receiving the registered information being transmitted according to the request.

Accordingly, when carrying out the communication, the communication device of the present invention selects one registered information that corresponds to the receiving communication device in accordance with, for example, a prescribed priority order. Then, the communication is carried out with the receiving communication device. At this time, the user can just designate the receiving communication device. The user is not required to set the communication channel or the communication protocol, or to set the identification information corresponding to tho communication channel and the communication protocol. In addition, the user is not required to be conscious about selecting the communication channel or the communication protocol. The communication channel, the communication protocol, the identification information, or the like are selected automatically, and the communication is carried out.

In addition, for example, when there is a change in the communication channel or the communication protocol that can carry out the communication, the change in the registered information accompanying the change in the communication channel or the communication protocol is sent to another communication device. The communication device that receives the notification updates the management table being stored. Accordingly, in the case there is a change in a particular communication device, the registered information is sent to other communication devices automatically, or in accordance with an instruction from the user, without the user of the communication device in which the change occurred notifying the user of each communication device. In other communication devices, the management table is updated automatically without the user carrying out an updating operation. Therefore, both the side in which there ha been a change in the communication device, and the side that carries out the communication with the changed communication device are not required to carry out any complicated operations. Furthermore, the updating operation is carried speedily since it is only the notification between the communication devices, and the management table its updated automatically by the sent registered information. Therefore, the user can use the communication device under the latest state at all times. Further, in the case there is no registered information in the management table, for example, when a new communication device is set up, the registered information can be obtained by [inquiring] requesting to another communication device. Accordingly, the user can be dismissed also from setting operation of initial registered information.

BRIEF DESCRIPTION OF THE DRAWINGS

FIG. 2 is a view showing an example of a management table.

FIG. 6 is a view showing an example of the management table.

FIG. 9 is a view showing an example of the registered information to be formed newly.

DETAILED DESCRIPTION OF THE PREFERRED EMBODIMENTS

First Embodiment

Figure 1:
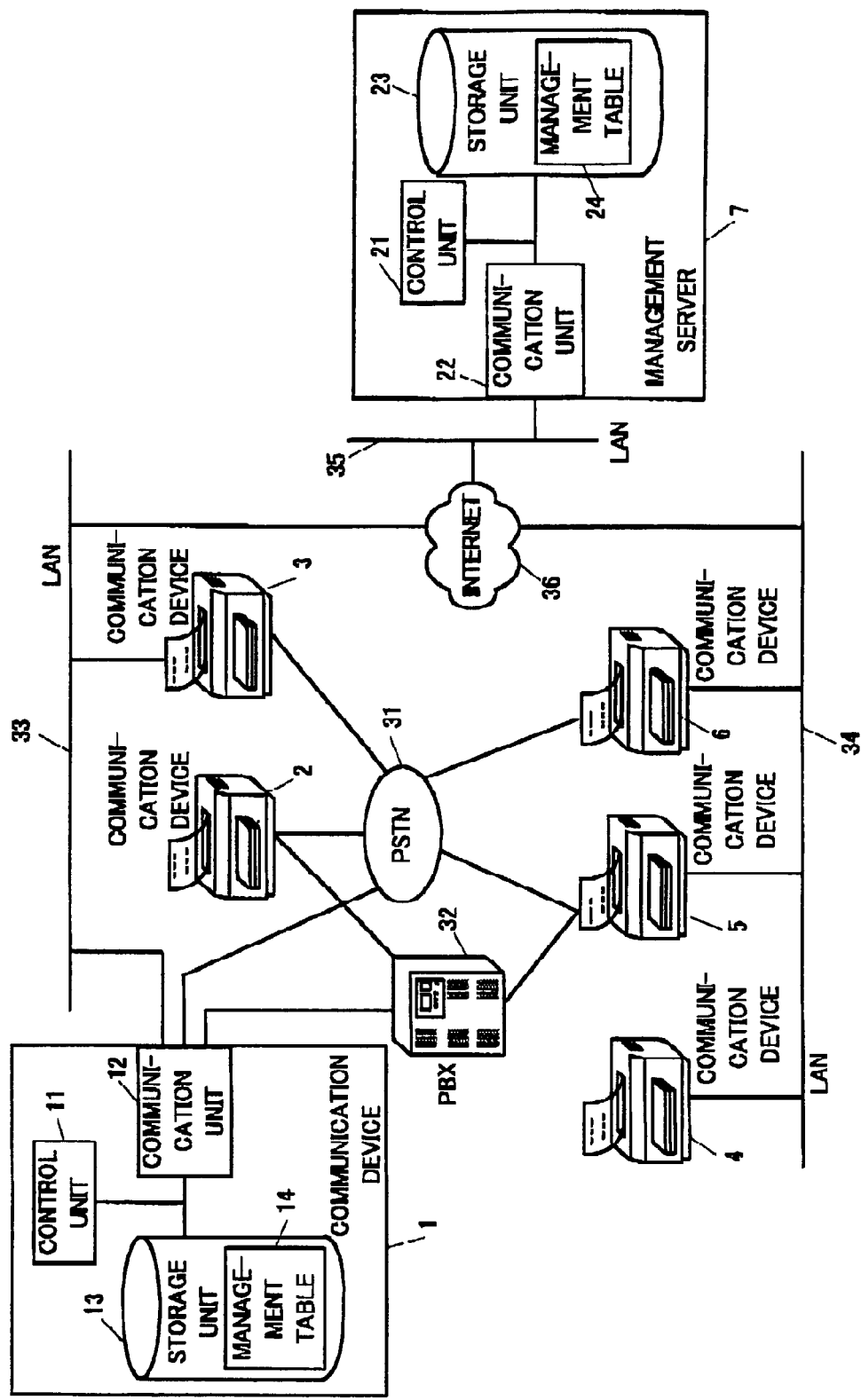
FIG. 1 is a block diagram showing an example of a communication system including a first embodiment or a communication device and a management server of the prevent invention.

FIG. 1 is a block diagram showing an example of a communication system including a first embodiment of a communication device and a management server of the present invention. In the drawings, reference number 1 through 6 are communication devices, 7 is a management server, 11, 21 are control units, 12, 22 are communication units, 13, 23 are storage units, 14, 24 are management tables, 31 is a public switched telephone network (PSTN), 32 is a private branch exchange (PBX), 33, 8, 1, 35 are LAN (Local Area Networks), and 36 is the Internet. In the example shown in FIG. 1, six communication devices and one management server 7 that manages registered information of these communication devices are shown. In addition, the PSTN 31, the PBX 32, the LANs 83, 34, 35, and the Internet 36 using the LANs 33, 34, 36 are shown as the communication channels. Moreover, the number of communication devices provided within the communication system is not limited. In addition, another communication channel can exist, and for example, wired communication channels, unwired communication channels, optical communication channels or the like can exist. In addition, there are cases when several communication protocols exist for each communication channel used.

In the example shown in FIG. 1, the communication device 1 can carry out a communication via the PSTN 31, the PBX 32, and the LAN 38. The communication device 2 can carry out a communication via the PSTN 31, and the PBX 82. The communication device 3 can carry out a communication via the PSTN 31, and the LAN 33. The communication device 4 can carry out a communication via the LAN 34. The communication device 5 can carry out a communication via the PSTN 31, the PBX 92, and the LAN 34. The communication device 6 can carry out a communication via the PSTN 31, and the LAN 34. The communication devices in the communication system can carry out a communication by any communication channel and communication protocol.

The communication device 1 includes a control unit 11, a communication unit 12, a storage unit 13, or the like. The control unit 11 controls each unit of the communication device 1, and conducts transmission and reception with another communication device via the communication unit 12. Before carrying out a communication with a receiving communication device, the communication device 1 obtains the management table 14 in advance from a remote management server 7 via communication unit 12. For example, communication device 1 can obtain the management table 14 by requesting the management server 7 to forward the management table 14 periodically or non-periodically. The communication device 1 can also obtain the management table 14 that is being distributed by the management server 7 periodically or non-periodically. Further, the information to be obtained from the management table 14 can be the entire management table 14. When obtaining the information for the second time and afterwards, the information to be obtained can be the registered information with changes or additions, or instructions for deletion. When the communication cannot be carried out directly with the management server 7, the communication device 1 can obtain the management table 14 by requesting another communication device to relay the communication.

When the receiving communication device is designated from an operation unit (not shown in the drawings) or another device (also not shows in the drawings) that is connected to the communication device 1, the control unit 11 searches the management table 14 in the storage unit 13 to be mentioned later on in accordance with specifying information that specifies the designated receiving communication device. Then, the control unit 11 obtains one or a plurality of registered information. When there is a plurality of registered information, one registered information is elected according to a prescribed priority order. Then, the communication device 1 carries out the communication with the receiving communication device via the communication unit 12 by the communication channel and the communication protocol in the selected registered information.

The priority order for when selecting the registered information can be, for example, the order the information was registered in the management table 14, the order according to a setting when there is a setting of the priority order, or the order ranked according to the type of the communication channel or the communication protocol. Moreover, the communication cost when the communication is carried out with the receiving communication device can be compared for each communication channel and communication protocol, and the registered information which is the lowest in cost can be used. In addition, the registered information, which is registered with the information relating to the receiving ability most suitable in the communication, can be selected according to the receiving ability of the receiving communication device. In addition, there are cases when it is favorable to carry out the communication by having the communication relayed by another communication device. In such a case, the determination for whether or not to use a relay communication device can be included for when determining the priority order. Furthermore, when the communication failed to end normally as a result of carrying out the communication in accordance with the registered information selected in the manner stated above, the next registered information can be selected, and it can be controlled to carry out the communication again. Such information on the priority order can be obtained from the management server 7.

Furthermore, when the communication cannot be carried out directly with the receiving communication device, a communication device that can carry out the communication with both the communication device 1 and the receiving communication device is made as the relayed communication device. The relay communication device is requested to relay the communication to the receiving communication device. Then, the communication device 1 carries out the communication with the relay communication device, and the communication is carried out with the receiving communication device indirectly. In addition, the communication devices 1 can include a function for relaying the communication by receiving a request for relaying from another communication device.

The communication unit 12 can carry out the communication using one or a plurality of communication channels. In addition, the communication unit 12 can carry out the communication by one or a plurality of communication protocols even for the same communication channel, by following the control of the control unit 11. In the example shown in FIG. 1, the communication unit 12 can carry out the communication using the PSTN 31, the PBX 32, the LAN 33, and Internet 36 via the LAN 33 as the communication channels. In addition, the communication unit 12 can carry out the communication by various communication protocols using these communication channels. For example, when using the PSTN 31, the communication unit 12 can carry out the communication by the G3 or G4 digitation and compression scheme. When using the LAN 88, the communication unit 12 can selectively use the HTTP, FTP (File Transfer Protocol) or the like, and also the SMTP and the POPS, which are used when forwarding the information as an electronic mail.

The storage unit 13 stores various information. The storage unit 13 stores the management table 14 in particular. The management table 14 is managed in a unified way by the management server 7. The management table 14 is obtained by accessing the management server 7 from the communication device, or obtained by receiving the distribution from the management server 7. The management table 14 is stored in the storage unit 13. The management table 14 is a table registered with a plurality of registered information. Further, the registered information is formed from the specifying information for specifying the communication device, the communication channel and the communication protocol that can be used when carrying out the communication with such a communication device, the identification information that is to be used in the communication channel and the communication protocol, and other various information. If the communication channel or the communication protocol is different for even the same communication device, the registered information is registered as different registered information. Therefore, there are cases when a plurality of registered information is registered for one communication device.

In the above description, only the inner structure of the communication device 1 has been described. The other communication devices 2 through 6 also have the same structure, and include a function for carrying out the communication with another communication device by obtaining the registered information of the management table from the management server 7 and using the registered information selectively.

The management server 7 includes the control unit 21, the communication unit 22, the storage unit 23, or the like. The control unit 21 controls each unit of the management server 7. In addition, the control unit 21 carries out the transmission and the reception with the communication devices 1 through 6 via the communication unit 22, and manages the communication. In particular, the management server 7 manages the registered information as the management table 24, and stores the management table 24 in the storage unit 23. Further, the registered information includes the communication channel and the communication protocol that can be used in the communication devices 1 through 6, and the identification information to be used in the communication channel and the communication protocol for specifying the communication device. In accordance with the request from the communication devices 1 through 6, the management server 7 returns all or a part of the contents of the management table 24 via the communication unit 22 to the communication device that requested for the management table 24. When returning a part of the management table 24, for example, only the part that has changed since the previous [inquiry] request can be returned. When the registered information is deleted, an instruction for deletion can be made. Moreover, when there is no change, an information showing the fact that there is no change can be returned.

Apart from returning all of or a part of the management table 24 in accordance with the request from the communication devices 1 through 6, for example, the management server 7 can distribute all or a part of the contents of the management table 24 to each of the communication devices 1 through 6 under a prescribed timing. The prescribed timing can be, for example, carrying out the distribution periodically, or when a change is made in the management table 24. In such a case, when distributing a part of the contents of the management table 24, only the part that has changed from the previous distribution can be distributed (when a part of the contents is deleted, an instruction to delete the registered information). When distributing the contents of the management table 24 periodically, there are cases when there is no change. In such a case, the information showing that there has been no change can be distributed. Even when carrying out such a distribution, the management table 24 can be returned to a communication device, which does not have the management table 24, in accordance with a request. Such a communication device can be, for example, a communication device that is added newly to the system, or a communication device which the memory has been deleted. Furthermore, when there is a change in the registered information, only the notification of such a fact can be distributed to each of the communication devices 1 through 6. Then, in accordance with the request from each of the communication devices 1 through 6, all or a part of the management table 24 can be returned.

Further, the transmission of all or a part of the management table 24 to the receiving communication device that cannot carry out the communication directly with the communication unit 22 can be carried out via a relay communication device. Further, the relay communication device is a communication device that can carry out the communication with both the management server 7 and the receiving communication device. The management server 7 can request the relay communication device to relay the communication to the receiving communication device. Then, the management server 7 can transmit all or a part of the management table 24. The selection of the relay communication device can be made by referring to the management table 24 being stored. In addition, the selection can be carried out in accordance with a priority order or the like that is the same as that of the above-mentioned communication device.

The operator can make an update, such as addition, change, or deletion, to the registered information of the management table 24 from, for example, an operating means (not shown in the drawings) of the management server 7. Alternatively, a request for the update of the registered information can be accepted via the communication unit 22, and the update can be made to the registered information. For example, when a communication device is exchanged or set up, or when there is an addition, a change or a deletion in the communication channel or the communication protocol in the existing communication device, it is only necessary to notify the management server 7 or a manager of the management server 7. As a result, labor can be saved, and since the management table of the communication device within the system can be updated, smooth communication can be maintained. In addition, the user of another communication device can carry out the communication without learning that there has been some change in the other communication devices, and without carrying out special operations.

The communication unit 22 can car out the communication using at least one communication channel. In the example shown in FIG. 1, the communication unit 22 can carry out the communication with the communication device via the Internet 36 by using the LAN 35. Further, the communication unit 22 can include at least one communication protocol that can carry out the communication.

The storage unit 28 stores various information. In particular, the storage unit 23 stores the management table 24 that is formed from a plurality of registered information. Further, the registered information includes the communication channel and the communication protocol that can be used in each communication device, the identification information to be used in the communication channel and the communication protocol, and some other information. As described above, the control unit 21 fetches and forwards the management table 24 to each communication device. In addition, the control unit 21 updates the management table 24.

FIG. 2 is a view showing an example of the management table. The management table is managed by the management server 7 as mentioned above. Copies of the management table are stored and used in each of the communication devices 1 through 6. FIG. 2 shows an example of the management table 14 being stored in the communication devices 1 through 6.

In the example of the management table shown in FIG. 2, terminal name and information such as specifying number, the communication channel, the identification information, the communication protocol, relay function, the receiving ability or the like, are made as a group, and each line is the registered information. The terminal name and the specifying number are the specifying information for specifying the receiving communication device. The specifying number is an identifier for specifying the communication device uniquely in the system. The management server 7 manages each communication device by the specifying number. For example, the specifying number can be allocated by the management server 7. The terminal name can be used for the user to distinguish the other communication devices. Moreover, the terminal name can be different for each communication devices. When the user designates the receiving communication device, the receiving communication device can be designated by either the terminal name or the specifying number.

For the communication channel, if the PSTN 31 can be used, it is shown "PSTN". If the PBX 32 can be used, it is shown "PBX". If the LAN 33 or the LAN 34 can be used, it is shown "LAN". Further, when the LAN is used, it is assumed that the Internet or the intranet is used via the LAN. Moreover, if other communication channels are used, such communication channels that can be used are shown in this field.

In addition, the communication protocol to be used in each communication channel is shown correspondingly. There are cases when a plurality of communication protocols can be used even for the same communication channel. In such a case, the registered information is set for each pair of the communication channel and the communication protocol. For example, the communication device 4 can use the LAN 34 as the communication channel, and T.38, and T.37S and T.37F as the communication protocol. Moreover, the communication protocol is not limited to the examples shown in FIG. 2. In addition, when the communication protocol that can be used in certain communication channels are limited to one, the communication protocol can be specified from the types of communication channels. Therefore, in such a case, it is not necessary to show the communication channel explicitly.

The identification information is the information of when specifying the communication device in each communication channel or in each communication protocol. For example, if the communication channel is the PSTN 81, the identification information is the telephone number. If the communication channel is the PBX 82, the identification information is the extension number. If the electronic mail is used in the LAN 33 or the LAN 34, the identification information is the electronic mail address. If using the HTTP, the identification information is the URL. In other protocols, for example, the identification information is the IP address or the like.

The information of relay function shows whether or not the communication device includes a forwarding function for another communication device. For example, when the communication cannot be carried out directly with the receiving communication device, the communication device can request relaying of the communication to a communication device that can communication with both the communication device and the receiving communication device. Then, the communication can be carried out substantially with the receiving communication device. However, even when a communication device can communication with both the communication device that requested relaying and the receiving communication device, if the communication device does not include a relaying function, relaying of the communication cannot be requested to such a communication device. Therefore, the relaying of the communication can be requested after confirming that the communication device includes the relaying function by referring to the field of the relay function.

The receiving ability includes information such as resolution, maximum paper size encoding method, color printing, etc. For example, when using the PSTN 31 as the communication channel and T.30 an the communication protocol, the ability of one another is confirmed during the process of the communication protocol. Therefore, the ability of the receiving communication device can be confirmed at the time of the communication, and the communication can be carried out by the maximum ability within the range. However, for example, when the LAN 33, the LAN 34, or the Internet 36 are used for the communication channel, and the SMTP or the like is used for the communication protocol, there are cases when the ability of the receiving communication device cannot be learnt at the time of the communication. In such a case, by referring to the field of the receiving ability, the ability of the receiving communication device can be learnt for each communication channel and communication protocol. Accordingly, the communication making full use of the ability of the receiving communication device can be carried out, and deterioration in the quality of the information exchanged by the communication can be eliminated or stored at minimum. Further, the kind of information to be stored as the receiving ability can be determined when needed. Moreover, in the example shown in FIG. 2, the receiving ability is stored for each registered information. However, for example, an ability table can be stored in the storage unit 13 apart from the management table, wherein the ability table assigns an ability to each of the communication devices.

Further, in the example shown in FIG. 2, the management table includes information of the communication channel and the communication protocol or the like that can carry out the communication for the management server 7. By forming the management table in such a way, when carrying out the communication with the management server 7, the communication channel and the communication protocol or the like can be determined in the same way as for the other communication device. Moreover, it is the same for when requesting relaying to another communication device. Alternatively, it can be assumed that the communication with the management server 7 is carried out by using the communication channel and the communication protocol that are determined in advance, and the registered information concerning the management server 7 can be not included in the management table.

The form of the management table shown in FIG. 2 is just one example, and other various information can be added, or unnecessary field can be deleted when appropriate. For example, if it is a system structure that does not request relaying, the field for relay function is unnecessary, and the relay communication device can be shown explicitly. In addition, when the receiving ability can be exchanged during the communication for all the communication channels and the communication protocols, the field for receiving ability is unnecessary.

Figure 3:
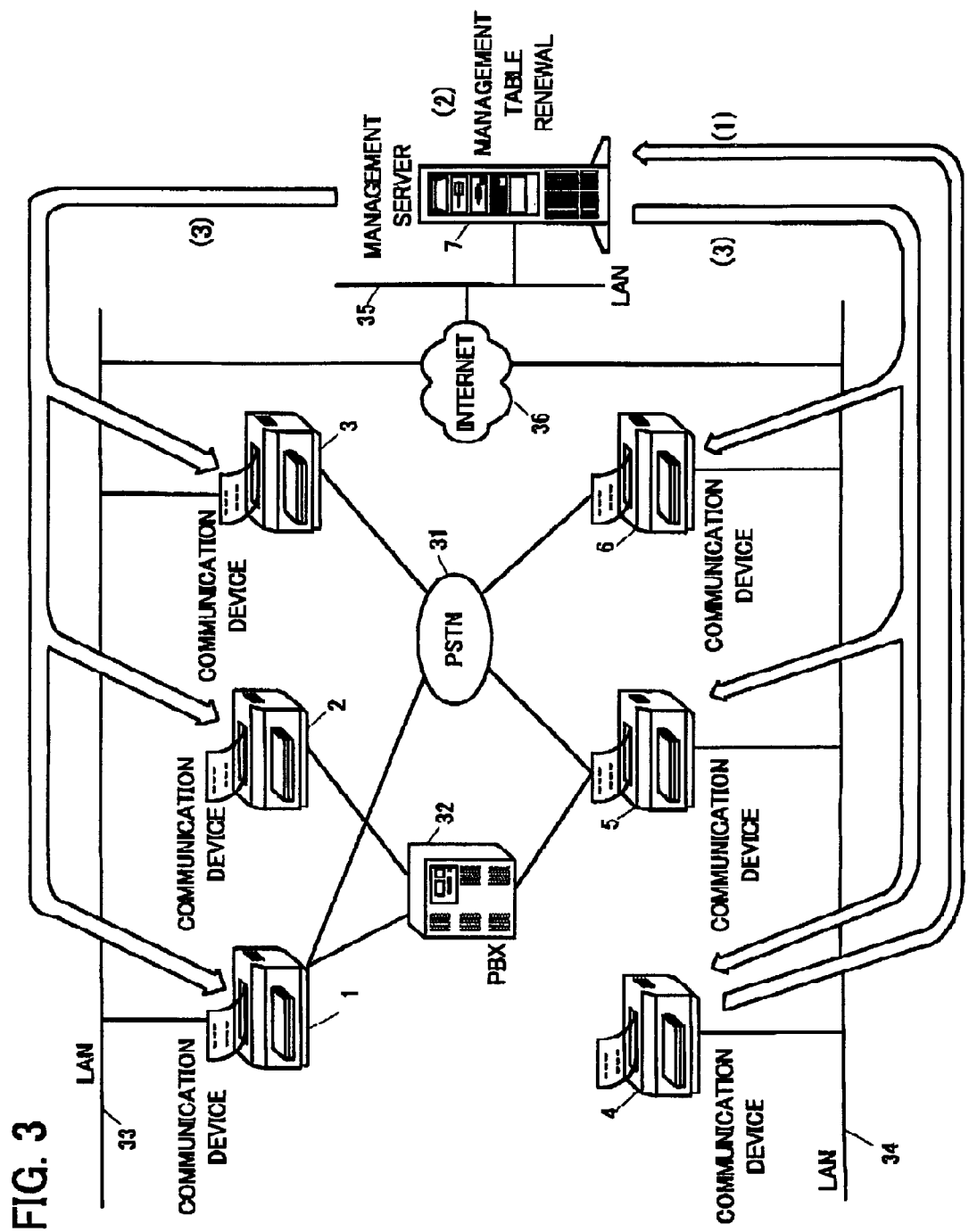
FIG. 3 is a view showing an example of an operation of when updating the management table in the communication System including the first embodiment of the communication device and the management server of the present invention.

FIG. 3 is a view showing an example of the operation of when updating the management table in the communication system including the first embodiment of the communication device and the management server of the present invention. In the example shown in FIG. 3, it is assumed of a case in which the communication device 4 became possible to carry out the communication using the PBX 32. In such a case, conventionally, the communication devices 1, 2, 3, 5, 6 that are to carry out the communication with the communication device 4 were notified with a fact that the communication using the PBX 32 has become practicable, and an extension number or the like. However, in the present invention, the communication device 4 can notify the change in the registered information to the management server 7 in (1) of FIG. 3. For example, the change in the registered information can be notified by carrying out the communication with the management server 7, and forwarding the information concerning the change to the management server 7 In this case, in (2), the management server 7 updates the management table 24 automatically, or under management of a manager. Alternatively, in (1), the communication device 4 can notify the change in the registered information to the manager managing the management server 7 by using some notification means. Then, in (2), the manager can update the management table 24 in the management server 7.

When the update of the management table 24 is completed, in (3), the updated management table 24 is distributed to each of the communication devices 1 through 6. Alternatively, a request from each of the communication devices 1 through 6 for taking out the management table 24 can be waited, and then, the updated management table 24 can be returned. In this came, for example, when the management table 24 is updated, each of the communication devices 1 through 6 can be notified with the fact that the management table 24 has been updated. The information to be distributed can be the entire management table 24, all registered information of the communication device 4, or only the added registered information of the communication device 4 for using the PBX 82 as the communication channel.

Further, the management server 7 is preferable to be capable of carrying out the communication directly with all communication devices provided within the system. Therefore, the management server 7 is preferable to be capable of using all communication channels and all communication protocols. However, the present invention shall not be limited to this example, and for example, the management server 7 can be using only a part of the communication channels and a part of the communication protocols. For example, when distributing the entire or a part of the management table 24 in (3) shown in FIG. 3, the communication device 2 does not have the communication channel that can carry out the communication directly with the management server 7. In such a case, the management server 7 requests a communication device to relay the communication, and distributes the entire or a part of the management table 24. Further, such a communication device can carry out the communication directly with both the management server 7 and the communication device 2. For example, the communication devices 1, 3, 5, 6 can carry out the communication directly with both the management server 7, and the communication device 2. However, when referring to the field of the relay function in the management table shown in FIG. 2, the communication device 6 does not include a relaying unction. Therefore, either one of the communication devices 1, 3, 5 is selected as the relay communication device, Then, the selected relay communication device is requested to relay the communication to the communication device 2, and the entire management table 24 or a part of the information is distributed to the selected relay communication device.

In such a manner, the notification for the change in the registered information, which has been notified from the communication device 4, is distributed to all communication devices 1 through 6 within the system. Therefore, the communication devices 1, 2, 3, 5, 6 can have the PBX 32 as a selection choice when carrying out the communication with the communication device 4, without receiving a notification from the communication device 4, or without taking time for changing the setting. Further, in each communication device, the communication channel and the communication protocol are selected automatically. Therefore, an increase of the communication channel in the communication device 4 means only an increase in the choices of when selecting the communication channel automatically for carrying out the communication with the communication device 4. Even when the communication device 4 has been connected to the PBX 32 and the communication is carried out by the PBX 32 being selected, the user of the communication devices 1, 2, 3, 5, 6 can carry out the communication without knowing this fact. Moreover, regarding the communication device 4, there is an increase in the range to which the communication can be carried out directly, and an increase in the number of the relay communication devices used when carrying out the communication with another communication device. However, the user of the communication device 4 can carry out the communication just by designating the communication device as in the same manner as that of the conventional manner. The user of the communication device 4 can carry out the communication without carrying out any new setting or operation.

Further, in the above example, the management server 7 only carried out either returning or distributing of the entire or a part of the management table 24. However, the management server 7 can also present other various information. As one example, the management server 7 can present information relating to priority order or information relating to selection condition of when selecting the registered information within the management table 14 in the communication devices 1 through 6. By such information being distributed from the management server 7, it becomes unnecessary for the user to make settings for the priority order or the selection condition in each of the communication devices 1 through 6. In addition, for example, the registered information can be selected in accordance with the same priority order within the system, or the priority order of the registered information in each communication device 1 through 6 can be adjusted in the management server 7 according to the load of each of the communication device 1 through 6.

Second Embodiment

Figure 4:
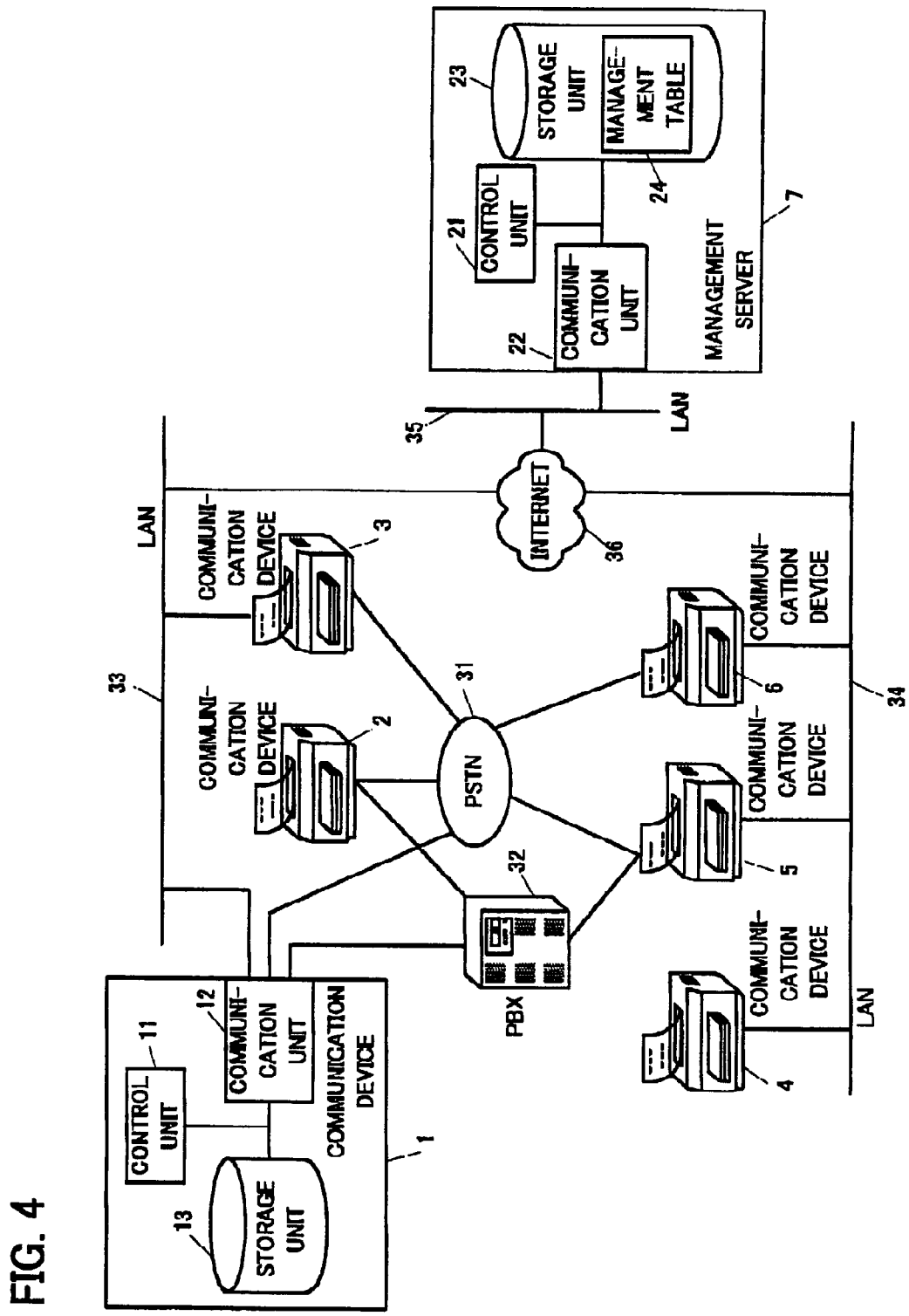
FIG. 4 is a block diagram showing an example of the communication system including a second embodiment of the communication device and the management server of the present invention.

FIG. 4 is a block diagram showing an example of the communication system including the second embodiment of the communication device and the management server of the present invention. The reference codes in FIG. 4 are the same as those in FIG. 1, and redundant description will be abbreviated. In the example shown in FIG. 4, each of the communication devices 1 through 6 does not include the management table 14. Each of the communication devices 1 through 6 request the registered information of the receiving communication device from the management server 7 each time when carrying out a communication. According to the request of the registered information from the communication devices 1 through 6, the management server 7 searches the management table 24, and returns the corresponding registered information. Further, when there is a plurality of registered information obtained from the search result, the management server 7 returns all corresponding registered information to the communication device requesting the registered information, or the management server 7 can select the registered information according to a prescribed priority order and return some of the registered information in higher priority order. Further, the communication between each communication device 1 through 6 and the management server 7 may be set in advance.

Under such a structure, just by maintaining the management table 24 in the newest state, the communication devices 1 through 6 in the system can use the same management table 24 at all times, and the communication can be carried out in accordance with the newest registered information. As a result, the communication devices 1 through 6 are not required to manage the management table 14. Only the management server 7 is required to manage the management table 24, and the management becomes easy.

Further, when there is a communication device that cannot carry out the communication directly with the management server 7 in the system, for example, the communication device 2 shown in FIG. 4, the request for the registered information is relayed by another communication device within the system. Therefore, there is a possibility for traffic within the system to increase, and a load to be applied on the relay communication device. To avoid such a case, the management server 7 is preferable to be able to carry out the communication by many communication channels and many communication protocols.

In addition, to reduce the traffic with the management server 7, for example, each communication device 1 through 6 can obtain only default registered information for carrying out the communication with each communication device from the management server 7, and stores the obtained registered information. Then, only when it is necessary to consider about using other communication channels or other communication protocols, for example, when there is an error, or when an applied communication is indicated, each communication device 1 through 6 can make a request to the management server 7.

Furthermore, in the example shown in FIG. 4, there is only one management server. However, the present invention is not limited to this example, and for example, it can be a structure in with the communication channel or the communication protocol is supplement by a plurality of management servers. In this case, each of the management servers is required to manage respective management tables 24 such that the management tables 24 are the same at all time.

Third Embodiment

Figure 5:
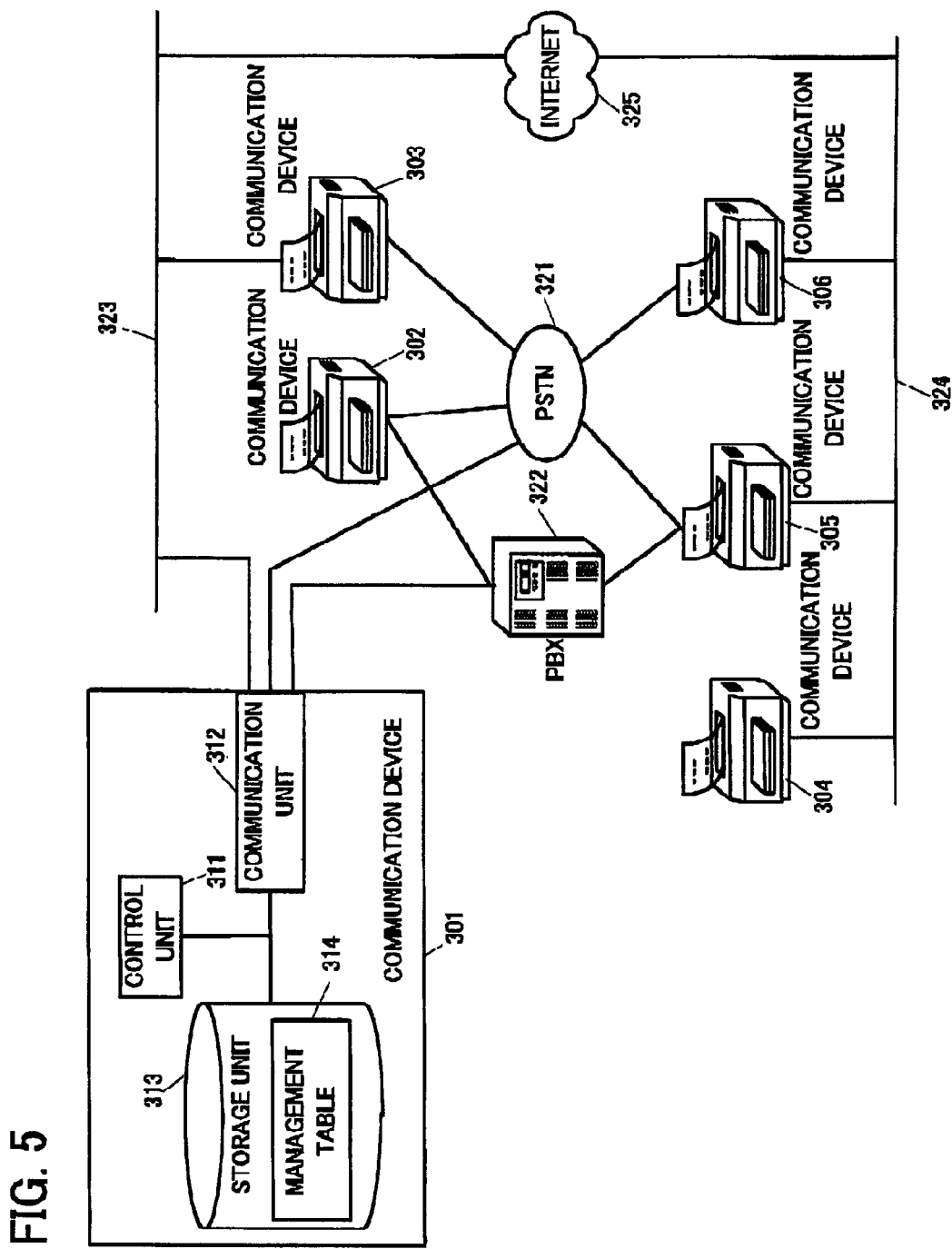
FIG. 5 is a block diagram showing an example of the communication system including a third embodiment of the communication device of the present invention.

FIG. 5 is a block diagram showing an example of the communication system including the third embodiment of the communication device of the present invention. In FIG. 5, the reference codes 301 through 306 are communication devices, 311 is a control unit, 312 is a communication unit, 313 is a storage unit, 314 is a management table, 321 is PSTN, 322 is PBX, 323, 324 are LANs, and 325 is Internet (IP network). In the example shown in FIG. 5, six communication devices are shown, and the PSTN 321, the PBX 322, the LAN 323, the LAN 824, and the Internet 325 using the LAN 323, the LAN 324 are shown as the communication channels. However, the number of communication devices provided in the communication system is not limited. In addition, another communication channel can exist, and for example, wired communication channel, unwired communication channel, optical communication channel or the like can exist. In addition, there are cases when several communication protocols exist of when each communication channel is used.

In the example shown in FIG. 5, the communication device 301 can carry out the communication via the PSTN 321, the PBX 322, and the LAN 323, The communication device 302 can carry out the communication via the PSTN 321, and the PBX 322. The communication device 303 can carry out the communication via the PSTN 321, and the 323, The communication device 304 can carry out the communication via the LAN 324. The communication device 305 can carry out the communication via the PSTN 321, the PBX 322, and the LAN 324. The communication device 306 can carry out the communication via the PSTN 321, and the LAN 324. The communication devices in the communication system can carry out the communication by any communication channel or any communication protocol.

The communication device 301 includes the control unit 311, the communication unit 312, the storage unit 313, or the like. Further, only the inner structure of the communication device 301 was described, however, the inner structure is formed in the same way for other communication devices 302 through 306.

The control unit 311 controls each unit in the communication device 301, and realizes transmission and reception with another communication device via the communication unit 312. When the receiving communication device is designated from an operation unit (not shown in the drawings) or another device (not shown in the drawings) that is connected to the communication device 301, the control unit 311 searches the management table 314 in the storage unit 313 to be mentioned later on in accordance with specifying information for specifying the designated receiving communication device. Then, the control unit 311 obtains one or a plurality of registered information. When there is a plurality of registered information, one registered information is selected in accordance with a prescribed priority order. Then, the communication is carried out with the receiving communication device via the communication unit 312 by the communication channel and the communication protocol in the selected registered information.

The priority order for when selecting the registered information can be, for example, the order the information was registered to the management table 314, the order according to a setting when there is a setting of the priority order, or the order ranked according to the type of the communication channel or the communication protocol. Moreover, the communication cost when the communication is carried out with the receiving communication device can be compared for each communication channel and communication protocol, and the registered information which is the lowest in cost can be used. In addition, the registered information, which is registered with the information relating to the receiving ability most suitable in the communication, can be selected according to the receiving ability of the receiving communication device. In addition, there are cases when it is favorable to carry out the communication by having the communication relayed by another communication device. In such a case, the determination for whether or not to use a relay communication device can be included when determining the priority order. Furthermore, when the communication failed to end normally as a result of carrying out the communication in accordance with the registered information selected in the manner stated above, the registered information in the next order can be selected, and it can be controlled to carry out the communication again.

Furthermore, when the communication cannot be carried out directly with the receiving communication device, a communication device that can communicate with both the communication device 801 and the receiving communication device is made as the relay communication device. The communication device 301 requests the relay communication device to relay the communication to the receiving communication device. Then, the communication device 301 carries out the communication with the relay communication device, and the communication is carried out with the receiving communication device indirectly. In addition, the communication device 301 can include a function for relaying the communication by receiving a request for relaying from another communication device.

Furthermore, the control unit 311 includes a function for forming the registered information of the management table 314 corresponding to a change when there is a change in the communication channel or the communication protocol, the identification information or the like that can be used in the communication by the communication unit 312, and notifying the formed registered information to each communication device registered in the management table 314 from the communication unit 312. When there is the registered information of the communication device 301 being stored in the management table 314 as to be described later on, such registered information is also updated. In addition, the timing for the notification can be at a point of time when the change in the communication channel, the communication protocol, the identification information or the like is registered to the communication device 301. Moreover, the notification can be carried out in accordance with an instruction from the user. The notification of the registered information by the instruction from the user can be carried out even when there is no change in the usable communication channel, communication protocol, identification information or the like. Furthermore, the information to be notified is not limited to the changed or add registered information of the communication device 301. A part of or the entire management table 314 can be noted. When there is a deletion of the registered information, a notification to delete the registered information can be made.

In addition, the control unit 311 can also include a function for requesting forwarding of the registered information within the management table to a certain communication device in accordance with an instruction from the user. For example, when the user wishes to update the management table 314, or when setting up a new communication device, or when the data of the management table 314 has been deleted, it requires enormous amount of work to set the registered information of many communication devices. In such a case, a certain communication device can be requested to forward the registered information within the management table, and by receiving the notification of the registered information, the management table 314 can be updated as described above. Accordingly, the work of the user can be saved. Further, when setting up a new communication device, the registered information of such a communication device is sent to each communication device.

The communication unit 312 can carry out the communication using one or a plurality of communication channels. In addition, the communication unit 312 can carry out the communication in accordance with one or a plurality of communication protocols even for the same communication channel, by following the control of the control unit 311, In the example shown in FIG. 5, the communication unit 312 can carry out the communication using the PSTN 321, the PBX 322, the LAN 323, and the Internet 325 via LAN 320 as the communication channels. In addition, the communication unit 312 can carry out the communication by various communication protocols using these communication channels. For example, when using the PSTN 321, the communication unit 312 can carry out the communication by the G3 or G4 digitation and compression scheme. When using the LAN 323, the communication unit 312 can selectively use the HTTP, the FTP or the like, and also the SMTP and the POPS which are used when forwarding the information as an electronic mail.

The storage unit 313 stores various information, The storage unit 313 stores the management table 314 in particular. The management table 314 is a table registered with registered information including specifying information for specifying the communication device, the communication channel and the communication protocol that can be used when carrying out the communication with such a communication device, identification information that is to be used in such a communication channel and a communication protocol, and other information. If the communication channel or the communication protocol is different for the same communication device, the registered information is registered as different registered information. Therefore, a plurality of registered information can be registered for one communication device.

FIG. 6 is a view showing an example of the management table. In the example of the management table 314 shown in FIG. 6, terminal name and information such as specifying number, the communication channel, the identification information, the communication protocol, relay function, the receiving ability or the like are made as a group, and each line is the registered information. The terminal name and the specifying number are the specifying information for specifying the receiving communication device. When the user designates the receiving communication device, the user can designate the destination according to these terminal names or specifying numbers. Further, the terminal name can be set not to overlap within one communication device, and the specifying number can be set not to overlap within the system. For example, the terminal name can be used as the name of the receiving communication device that can be set by each user of the communication device. In addition, when transferring the registered information between the communication devices, each communication device is specified by the specifying number. When the control unit 311 carries out the notification of the registered information, the terminal name or the like can be excluded from the object of the notification.

For the communication channel, if the PSTN 321 can be used, it is shown "PSTN". If the PBX 322 can be used, it is shown "PBXS". If the LAN 323 or the LAN 324 can be used, it is shown "LAN". Further, when the LAN can be used, it is assumed that the Internet or the intranet can be used via the LAN. Moreover, if other communication channels can be used, such communication channels that can be used is shown in this field.

In addition, the communication protocol to be used in each communication channel is shown correspondingly. There are cases when a plurality of communication protocols can be used even for the same communication channel. In such a case, the registered information is set for each pair of the communication channel and the communication protocol. For example, the communication device 304 can use the LAN 324 as the communication channel, and T.38, and T.37S and T.37F as the communication protocol. Moreover, the communication protocol is not limited to the examples shown in FIG. 6. In addition, when the communication protocol that can be used in certain communication channel is limited to one, the communication protocol can be specified from the types of communication channel. Therefore, in such a case, it is not necessary to show the communication channel explicitly.

The identification information is the information of when specifying the communication device in each communication channel or in each communication protocol. For example, if the communication channel is the PSTN 321, the identification information is the telephone number. If the communication channel is the PBX 322, the identification information is the extension number. If the electronic mail is used in the LAN 323 or the LAN 324, the identification information is the electronic mail address. If using the HTTP, the identification information is the URL. In other protocols, for example, the identification information is the IP address or the like.

The information of relay function shows whether or not the communication device includes a forwarding function for another communication device. For example, when the communication cannot be carried out directly with the receiving communication device, the communication device can request relaying of the communication to a communication device that can communication with both the communication device and the receiving function communication device. Then, the communication can be carried out substantially with the receiving communication. However, even when the communication device can communication with both the communication device that requested relaying and the receiving communication device, if the communication device does not include the relaying function, relaying of the communication cannot be requested to such a communication device. Therefore, the relaying of the communication can be requested after confirming that the communication device includes the relaying function by referring to the field of the relay function.

The receiving ability includes information such as resolution, maximum paper size, encoding method, color printing, etc. For example, when using the PSTN 321 as the communication channel and T.30 as the communication protocol, the ability of each communication device is confirmed during the process of the communication protocol. Therefore, the ability of the receiving communication device can be confirmed at the time of the communication, and the communication can be carried out by the maximum ability within the range. However, for example, when the LAN 323, the LAN 324, or the Internet 325 are used as the communication channel, and the SMTP or the like is used for the communication protocol, there are cases when the ability of the receiving communication device cannot be learnt at the time of the communication. In such a case, by referring to the field of the receiving ability, the ability of the receiving communication device can be learnt for each communication channel and communication protocol. Accordingly, the communication making full use of the ability of the receiving communication device can be carried out, and deterioration in the quality of the information exchanged by the communication can be eliminated or stored at minimum. Further, the kind of information to be stored as the receiving ability can be determined when needed, Moreover, in the example shown in FIG. 6, the receiving ability is stored for each registered information, However, for example, an ability table can be stored in the storage unit 313 apart from the management table, wherein the ability table assigns an ability to each of the communication devices.

The form of the ability management table shown in FIG. 6 is just one example, and other various information can be added, or unnecessary field can be deleted when appropriate. For example, the terminal name field can be not provided, and the communication device can always be designated by the specifying number. In addition, if it is a system structure that does not request relaying, the field for relay function is unnecessary, and the relay communication device can be shown explicitly. In addition, when the receiving ability can be exchanged during the communication for all the communication channels and the communication protocol, the field for receiving ability is unnecessary.

Next, an example of the operation in the communication system including the third embodiment of the communication device of the present invention will be described. When carrying out the communication with the receiving communication device, first, one registered information is selected from the management table 314 corresponding to the indicated communication device in accordance with a prescribed priority older. At this time, there are cases when the communication cannot be carried out directly with the receiving communication device. In such a case, the communication can be carried out by relaying the communication to another communication device. Moreover, according to some priority order, there are cases when the relay communication is selected with priority than the direct communication. For example, when carrying out a broadcast communication by the communication device that cannot carry out the communication using the LAN or the Internet, by requesting the communication device that can carry out the communication through the LAN to relay the communication, a broadcast function by the electronic mail can be used. As a result, the distribution can be carried out efficiently. As in such a case when requesting relaying of the communication to another communication device, one registered information is selected from the management table 314 corresponding to the relay communication device. Then, the communication channel and the communication protocol are selected in accordance with the selected registered information. By using the identification information, the communication is carried out with the receiving communication device or the relay communication device.

In such a manner, in the present invention, the communication channel and the communication protocol are selected automatically. Therefore, even when the receiving communication device includes a plurality of communication channels or communication protocols, the user is not required to select the communication channel or the communication protocol, or to set the identification information such as the telephone number or the address accompanying the selection. In addition, even when the communication is relayed by another communication device, it is selected to carry out the relaying automatically, and the selection of the relay communication device, and the communication channel the communication protocol or the like are carried out automatically. Therefore, even in such a case, the user can carry out the communication with the receiving communication device easily Further, when the communication using the communication channel and the communication protocol selected at first ends in a failure, the registered information of the next priority order can be selected, and the communication can be carried out again. In this case, there are cases when it is necessary to change the communication channel or the communication protocol, or to switch the communication from direct communication to relay communication, or the reverse, or to change the relay communication device. These switching operations can also be carried out automatically.

Figures 7A, 7B:
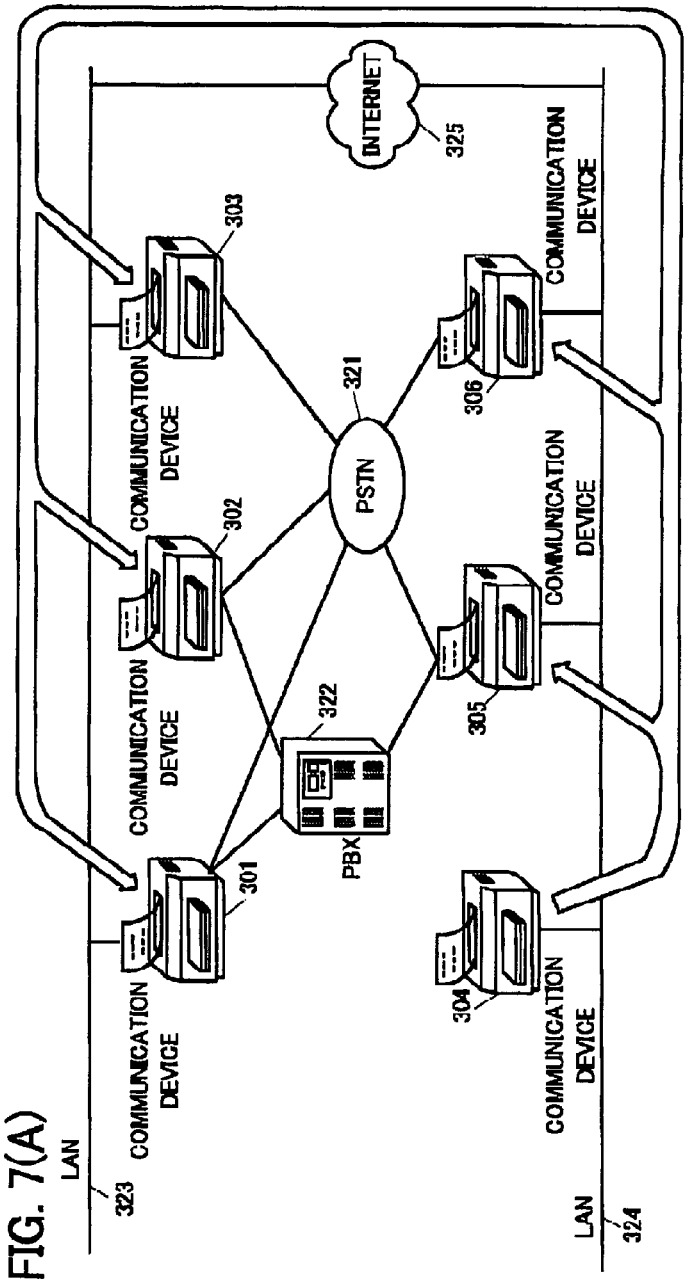
FIG. 7 is a view showing an example of an operation of when changing the registered information in the communication system including the third embodiment of the communication device of the present invention.

FIG. 7 is a view showing an example of the operation of when changing the registered information in the communication system including the third embodiment of the communication device of the present invention. In the example shown in FIG. 7(A), the communication device 304 may become capable of carrying out the communication using the PBX 322. In such a case, conventionally, the communication devices 301, 302, 303, 305, 306 that are to carry out the communication with the communication device 304 are notified with a document or the like including the fact that the communication using the PBX 322 has become possible, the extension number, or the like. However, in the present invention, the communication device 304 forms the registered information along with the information such as the communication protocol, the extension number, the receiving ability or the like of when using the PBX 322. For example, the registered information as shown in FIG. 7(B) can be formed. Further, when the registered of the communication device 304 is registered in the management table, the management table within the communication device 304 is updated by the formed registered information. In this case, the newly formed registered information is added.

Generally, when there is a change in the communication channel, the communication protocol, the identification information, the ability or the like, various settings are made to the communication device, and the registered information is formed based on the setting as described above. At a point of time when a change is made to the setting, such a change can be detected, and the registered information can be formed automatically. Alternatively, the registered information can be formed in accordance with an instruction from the user.

Then, at least the formed registered information is distributed to other communication devices 301, 303, 303, 305, 306. The registered information is distributed by using the registered information being registered in the management table. At this time, the registered information in distributed in a sequential order to each of the communication devices 301, 302, 303, 305, 306, and the registered information can also be distributed by using broadcast communication. In either form of distribution, one registered information is selected in the same manner as in the above mentioned normal communication. Then, the communication can be carried out in accordance with the selected registered information. For example, the broadcast communication using the electronic mail can be used for the communication devices 301, 303, 305, 306. In addition, for the communication device 302, for example, the communication can be carried out individually by using the PBX 322 or the like, and at least the newly formed registered information can be distributed. Moreover, the distribution method is not limited to this example, and various distribution methods can be used. For example, the registered information can be distributed by being relayed by another communication device.

Moreover, the distribution of new registered information is not limited for the addition of the communication channel. For example, changing, adding, deleting or the like of the information in various data being registered as the registered information, such as communication channel, the communication protocol, the identification information, the receiving ability or the like, can also be distributed in the same manner. The information to be distributed is not limited to the new registered information. For example, all registered information relating to one communication device can be distributed, or the entire management table can be distributed.

The format of the registered information to be distributed can be a binary format, or other various formats, such as structured document format of XML (Extensible Markup Language) or the like.

The communication device receiving the distribution of the registered information in the above manner updates the management table by the received registered information. When the communication device 304 becomes practicable to carry out the communication using the PBX 322, each of the communication devices 301, 302, 303, 305, 306 adds the received registered information to the management table as the registered information corresponding to the communication device 304. Accordingly, the addition of the communication channel in the communication device 304 is cent to all the other communication devices 301, 302, 303, 305, 306. As a result, the management tables in all communication devices are changed into the same contents. At this time, the user of the communication devices 301, 302, 303, 305, 306 is not required to carry out any operation to change the registered information for the communication device 304, and the management table is updated to the newest registered information automatically. Therefore, the user of each communication device can carry out the communication by using the newest registered information at all times without being conscious about the changes in the communication channel, the communication protocol, the identification information or the like in other communication devices.

Figure 8:
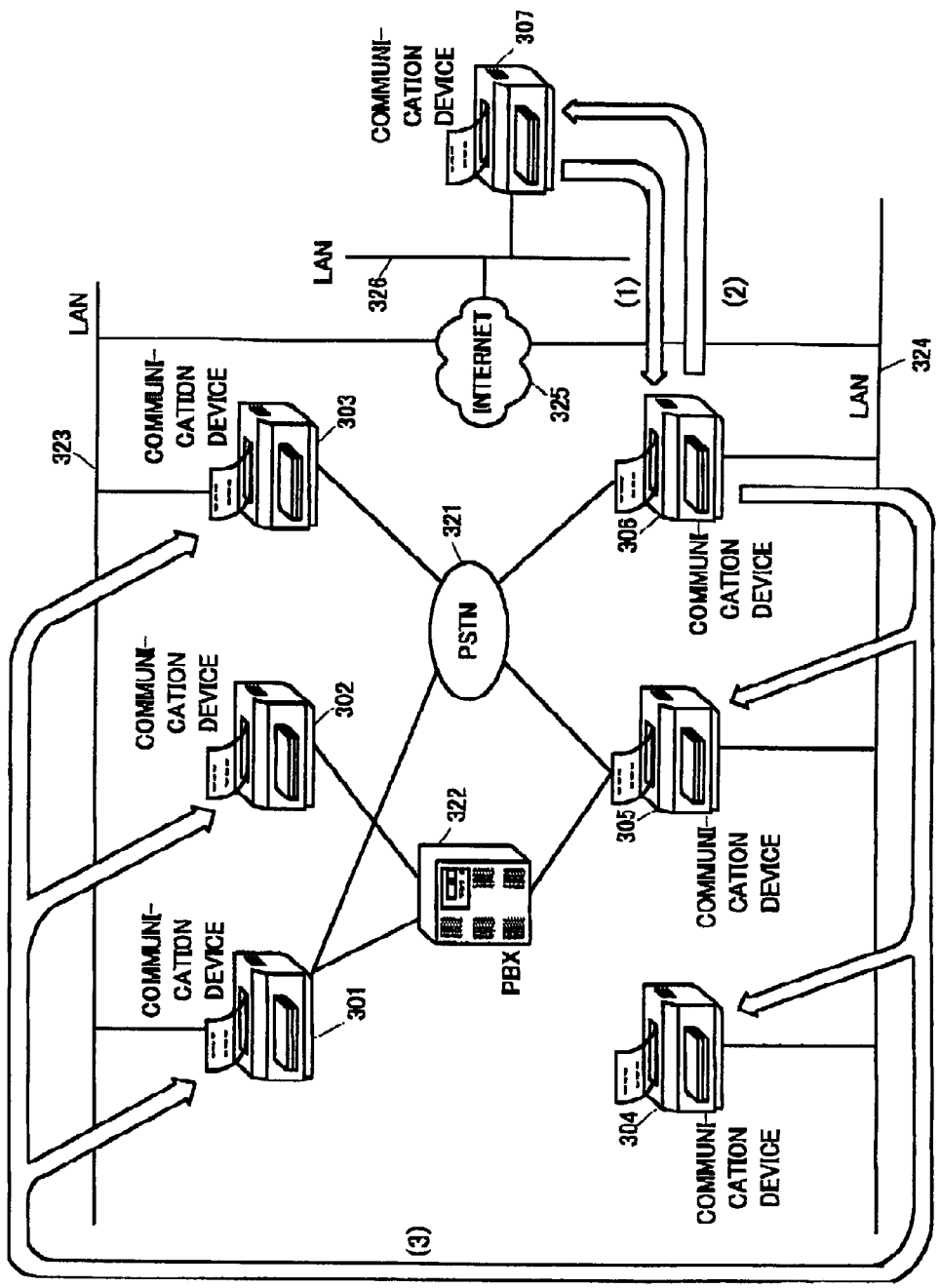
FIG. 8 is a view showing an example of the operation of when a new communication device is added to the communication system.

FIG. 8 is a view showing an example of the operation of when a new communication device is added to the communication system. FIG. 9 is a view showing an example of the registered information to be formed newly. In the drawings, the reference code 307 is a communication device, and 326 is a LAN. Conventionally, when a new communication device is introduced to the communication system, or when the communication device is exchanged, it was necessary to set from the start, various information relating to the receiving communication device. In addition, when the registered information in the management table is lost, for example, by the memory being cleared due to failures, it was also necessary to set from the start, various information relating to the receiving communication device. However, in the present invention, the communication device can include a function for requesting forwarding of the registered information within the management table to existing communication devices in the communication system. In addition, the communication device can also include a function for forwarding the registered information within the management table to the requested communication device by receiving such a request. By using these functions, the management table can be updated automatically at the time when it becomes necessary to set from the start, various information relating to the receiving communication device.

The example of FIG. 8 shows a case in which the communication device 307 is added newly to the communication system. The communication device 307 includes various function relating to the management table that is the same as other communication device 301 through 306. The communication device 307 is connected to the LAN 326. In addition, the communication device 307 can carry out the communication with the other communication devices 301 through 306 via the Internet 325.

When the communication device 307 is added newly the communication system, various settings are made from the communication in the communication device 307. Then, when the completion of the setting is detected, or when an instruction from the user is received, the communication device 307 forms the registered information of the communication device 307. An example of the formed registered information is shown in FIG. 9. Then, in (1) shown in FIG. 3, the communication device 307 transmits the formed registered information to the existing communication devices within the communication system, and the communication device 307 requests forwarding of the registered information within the management table. In the example shown in FIG. 8, the communication device 306 is requested to forward the registered information within the management table.

The communication device 306, which has been requested to forward the registered information within the management table, updates its management table according to the registered information received from the communication device 307. Then, the communication device 906 forwards the updated registered information within the management table to the requested communication device 307 in (2). The communication device 307 can register the forwarded registered information to the management table. Accordingly, the newly set communication device 307 can form and use the management table without inputting the registered information for the other communication devices 301 through 306. Moreover, since the registered information to be received is updated at all times as described above, the communication device 307 can register the newest registered information to the management table, and use the newest registered information.

Furthermore, the registered information for the communication device 307 is sent also to the other communication devices 301 through 305. In the example shown in FIG. 8, the communication device 306, which has been requested to forward the registered information in the management table from the communication device 307, notifies the other communication devices 301 through 305 in (3). In this case, only the registered information of the communication device 307, or the entire or a part of the registered information within the management table can be sent to the other communication devices 301 through 305.

Moreover, the communication device 307, which has received the forwarding of the registered information within the management table from the communication device 306, can distribute the registered information of the communication device 307, or the entire or a part of the registered information within the management table that includes the registered information of the communication device 307 itself, to each of the communication devices 301 through 305 in accordance with the received registered information.

Each of the communication devices that has received the notification can update each management table respectively according to the received registered information. Accordingly, even when a communication device is added newly to the communication system, the registered information of the added communication device is sent to all the other communication devices within the communication system, and the management table can always be maintained under the newest state, Therefore, the user of either communication device can carry out the communication by using the newest registered information at all times, without carrying out an operation for registration or change. Further, the fact that a new communication device is added and such a now communication device can be designated as the receiving communication device, is necessary to be notified in some method to the user who is necessary to carry out the communication with the newly added communication device. Moreover, the changer in the registered information in each communication device can be sent to the user, or example, by printing out or displaying the fact.

Further, when the communication device is exchanged, the registered information can be deleted and the above-mentioned process for adding a new communication device can be carried out. In addition, for example, when a new communication device is introduced, various information relating to the priority order for when selecting the registered information becomes necessary. Such various information can be requested to be forwarded and received from a certain communication device within the communication system. As a result, work can be saved for various settings and inputs for the conditions relating to the priority order. Moreover, for other various information, the information can be forwarded and shared according to the request from one another.

What is claimed is:

1. A communication device comprising:
    means for carrying out a communication by a plurality of communication channels and a plurality of communication protocols;
    a management table including plural groups of registered information corresponding to a receiving communication device, wherein each group of the plural groups of registered information includes a communication channel and a communication protocol that can be used by the receiving communication device, and identification information used by the communication channel and the communication protocol; and means for obtaining the management table in advance, remote from the communication device, selecting one group from the plural groups of registered information corresponding to the receiving communication device according to a prescribed priority order based on a relay communication ability, and controlling the means for carrying out a communication to carry out the communication using the selected group of registered information.

2. A communication device comprising:

means for carrying out a communication by a plurality of communication channels and a plurality of communication protocols; and means for obtaining plural groups of registered information corresponding to a receiving communication device from a location remote from the communication device, selecting one group from the plural groups of registered information corresponding to the receiving communication device according to a prescribed priority order based on a relay communication ability, and controlling the means for carrying out a communication to carry out the communication using the selected group of registered information;

wherein each group of the plural groups of registered information includes a communication channel and a communication protocol that can be used by the receiving communication device, and identification information used in the communication channel and the communication protocol of the receiving communication device.

3. A management server comprising:

means for carrying out a communication directly or indirectly with each of a plurality of communication devices;

a management table including plural groups of registered information corresponding to a receiving communication device, wherein each group of the plural groups of registered information includes a communication channel and a communication protocol that can be used by the receiving communication device, and identification information used in the communication channel and the communication protocol of the receiving communication device;

means for selecting one group from the plural groups of registered information corresponding to the receiving communication device according to a prescribed priority order based on a relay communication ability; and means for transmitting all or a part of the management table to a communication device by the means for carrying out a communication according to a request from a communication device.

4. A management server comprising:

means for carrying out a communication directly or indirectly with each of a plurality of communication devices;

a management table including plural groups of registered information corresponding to a receiving communication device, wherein each group of the plural groups of registered information includes a communication channel and a communication protocol that can be used by the receiving communication device, and identification information to be used in the communication channel and the communication protocol of the receiving communication device;

means for selecting one group from the plural groups of registered information corresponding to the receiving communication device according to a prescribed priority order based on a relay communication ability; and means for distributing all or a part of the management table to the communication devices by the means for carrying out a communication under a prescribed timing.

5. A communication device comprising:

means for carrying out a communication by a plurality of communication channels and a plurality of communication protocols;

a management table including plural groups of registered information corresponding to a receiving communication device, wherein each group of the plural groups of registered information includes a communication channel and a communication protocol that can be used by the receiving communication device and identification information used in the communication channel and the communication protocols; and means for controlling a communication using one group from the plural groups of registered information corresponding to the receiving communication device selected according to a prescribed priority order based on a relay communication ability, wherein the means for controlling includes a function for sending the one or plural groups of registered information to other communication devices from the means for carrying out a communication.

6. The communication device according to claim 5, wherein when there is a change in the communication channel or the communication protocol used in the communication by the means for carrying out a communication, the means for controlling sends at least the registered information of the communication device to other communication devices.

7. The communication device according to claim 6, wherein the means for controlling sends at least the registered information of the communication device to the other communication devices in accordance with an instruction from a user.

8. A communication device comprising:

means for carrying out a communication by a plurality of communication channels and a plurality of communication protocols;

a management table including plural groups of registered information corresponding to a receiving communication device, wherein each group of the plural groups of registered information includes a communication channel and a communication protocol that can be used by the receiving communication device, and identification information used in the communication channel and the communication protocol; and means for controlling a communication using one group from the plural groups of registered information corresponding to the receiving communication device selected according to a prescribed priority order based on a relay communication ability, wherein the means for controlling includes a function for updating the management table when receiving the one or plural groups of registered information from another communication device, according to the received one or plural groups of registered information.

9. The communication device according to claim 8, wherein the means for controlling includes a function for requesting another communication device to transmit the one or plural groups of registered information within the management table, and the means for controlling updates the management table by receiving registered information being transmitted according to the request.

10. A method for controlling a communication device comprising:
- obtaining a management table including plural groups of registered information corresponding to a receiving communication device from a location remote from the communication device in advance, wherein each group of the plural groups of registered information includes the communication channel and the communication protocol that can be used by the receiving communication device, and an identification information to be used in the communication channel and the communication protocol;
- selecting one group from the plural groups of registered information corresponding to the receiving communication device from the management table according to a prescribed priority order based on a relay communication ability; and
- carrying out a communication by the communication device and the receiving communication device.

11. A method for controlling a management server comprising:
- storing a management table including plural groups of registered information corresponding to a receiving communication device, wherein each group of the plural groups of registered information includes a communication channel and a communication protocol that can be used by the receiving communication device, and identification information to be used in the communication channel and the communication protocol;
- carrying out the communication directly or indirectly with the receiving communication device;
- selecting one group from the plural groups of registered information corresponding to the receiving communication device from the management table according to a prescribed priority order based on a relay communication ability; and
- transmitting all or a part of the management table to the receiving communication device according to a request from the receiving communication device.

12. A method for controlling a communication device comprising:
- storing a management table including plural groups of registered information corresponding to a receiving communication device, wherein each group of the plural groups of registered information includes a communication channel and a communication protocol that can be used by the receiving communication device, and identification information to be used in the communication channel and the communication protocol;
- selecting one group from the plural groups of registered information corresponding to the receiving communication device from the management table according to a prescribed priority order based on a relay communication ability; and
- sending the registered information to the receiving communication device.

13. A method for controlling a communication device comprising:
- storing a management table including plural groups of registered information corresponding to a receiving communication device, wherein each group of the plural groups of registered information includes a communication channel and a communication protocol that can be used by the receiving communication device, and identification information to be used in the communication channel and the communication protocol;
- selecting one group from the plural groups of registered information corresponding to the receiving communication device from the management table according to a prescribed priority order based on a relay communication ability; and
- updating the management table by the one group of registered information when receiving the one group of registered information from the receiving communication device.

14. A communication device comprising:
- a communication unit for carrying out a communication by a plurality of communication channels and a plurality of communication protocols;
- a management table including plural groups of registered information corresponding to a receiving communication device, wherein each group of the plural groups of registered information includes a communication channel and a communication protocol that can be used by the receiving communication device, and identification information used by the communication channel and the communication protocol; and
- a control unit obtaining the management table in advance, remote from other communication device, selecting one group from the plural groups of registered information corresponding to the receiving communication device according to a prescribed priority order based on a relay communication ability, and controlling the communication unit to carry out the communication using the selected group of registered information.

15. A communication device comprising:
- a communication unit for carrying out a communication by a plurality of communication channels and a plurality of communication protocols; and
- a control unit obtaining plural groups of registered information corresponding to a receiving communication device from a location remote from the communication device, selecting one group from the plural groups of registered information corresponding to the receiving communication device according to a prescribed priority order based on a relay communication ability, and controlling the communication unit to carry out a communication using the selected group,
- wherein each group of the plural groups of registered information includes a communication channel and a communication protocol that can be used by the receiving communication device, and identification information used in the communication channel and the communication protocol of the receiving communication device.

16. A management server comprising:
- a communication unit which carries out a communication directly or indirectly with each of a plurality of communication devices;
- a management table formed from plural groups of registered information corresponding to a receiving communication device, wherein each group of the plural groups of registered information includes a communication channel and a communication protocol that can be used by the receiving communication device, and identification information used in the communication channel and the communication protocol of the receiving communication device; and
- a control unit selecting one group from the plural groups of registered information corresponding to the receiving communication device according to a prescribed priority order based on a relay communication ability, and transmitting all or a part of the management table to a communication device by the communication unit according to a request from one of the plurality of communication devices.

17. A management server comprising:
a communication unit carrying out communication directly or indirectly with each of a plurality of communication devices;
a management table formed from plural groups of registered information corresponding to a receiving communication device, wherein each group of the plural groups of registered information includes a communication channel and a communication protocol that can be used by the receiving communication device, and identification information to be used in the communication channel and the communication protocol of the receiving communication device; and
a control unit selecting the one group from the plural groups of registered information corresponding to the receiving communication device according to a prescribed priority order based on a relay communication ability, and distributing all or a part of the management table to the communication devices by the communication unit under a prescribed timing.

18. A communication device comprising:
a communication unit carrying out a communication by a plurality of communication channels and a plurality of communication protocols;
a management table including plural groups of registered information corresponding to a receiving communication device, wherein each group of the plural groups of registered information includes a communication channel and a communication protocol that can be used by the receiving communication device, and identification information used in the communication channel and the communication protocol of the receiving communication device; and
a control unit selecting one group from the plural groups of registered information corresponding to the receiving communication device according to a prescribed priority order based on a relay communication ability, and controlling a communication using the one group of registered information,
wherein the control unit includes a function for sending the one group of registered information to each of the other communication devices from the communication unit.

19. The communication device according to claim 18, wherein when there is a change in the communication channel or the communication protocol used in the communication by the communication unit, the control unit sends the at least one group of registered information to other communication devices.

20. The communication device according to claim 19, wherein the control unit sends the one group of registered information to the other communication devices in accordance with an instruction from a user.

21. A communication device comprising:
a communication unit which carries out a communication by a plurality of communication channels and a plurality of communication protocols;
a management table including plural groups of registered information corresponding to a receiving communication device, wherein each group of the plural groups of registered information includes a communication channel and a communication protocol that can be used by the receiving communication device, and identification information used in the communication channel and the communication protocol of the receiving communication device; and
a control unit for controlling a communication using one group from the plural groups of registered information corresponding to the receiving communication device and for selecting the one group of registered information according to a prescribed priority order based on a relay communication ability,
wherein the control unit includes a function for updating the management table when receiving the one group of registered information from another communication device, according to the received one group of registered information.

22. The communication device according to claim 21, wherein the control unit includes a function for requesting another communication device to transmit the one group of registered information within the management table, and the control unit updates the management table by receiving registered information being transmitted according to the request.

23. The communication device according to claim 1, wherein the prescribed priority order is based on at least one of a communication channel rank, a communication protocol rank, a communication cost or, a receiving ability of a receiving communication device.

24. The management server according to claim 3, wherein all or a part of the management table is transmitted by the means for carrying out the communication according to the prescribed priority order.

25. The communication device according to claim 1, wherein the each group of the plural groups of registered information includes the relay communication ability.

* * * * *